United States Patent

[11] 3,580,308

| [72] | Inventor | Douglas D. Hamilton<br>Montreal, Canada |
|---|---|---|
| [21] | Appl. No. | 639,536 |
| [22] | Filed | May 18, 1967 |
| [45] | Patented | May 25, 1971 |
| [73] | Assignees | Canadian International Paper Company<br>Montreal, Quebec, ;<br>Quebec North Shore Paper Company<br>Montreal; St. Ann Abitibi Paper Ltd.,<br>Beaupre, Canada, fractional part interest to each |
| [32] | Priority | May 20, 1966 |
| [33] |  | Canada |
| [31] |  | 960,902 |

[54] TREE PROCESSING APPARATUS WITH FEED ROLLS
15 Claims, 5 Drawing Figs.

[52] U.S. Cl. .................................................. 144/3,
  144/246
[51] Int. Cl. .................................................. B27c 1/12,
  B27c 9/00, B27l 1/00, B27l 11/00
[50] Field of Search ........................................... 144/246,
  208-5, 2—21, 3—4, 309—34

[56] References Cited
UNITED STATES PATENTS
3,228,439   1/1966   Jonsson et al. ................. 144/246X

| 2,863,551 | 12/1958 | Biloco .......................... | 144/246X |
| 2,860,672 | 11/1958 | Brundell et al. ............... | 144/208 |
| 2,857,945 | 10/1958 | Brundell et al. ............... | 144/208 |
| 3,356,116 | 12/1967 | Brundell et al. ............... | 144/3 |
| 3,351,107 | 11/1967 | Hamilton ....................... | 144/3 |

FOREIGN PATENTS
116,522   6/1946   Sweden ........................ 144/208

*Primary Examiner*—Francis S. Husar
*Attorney*—Craig, Antonelli, Stewart and Hill ABSTRACT: A device for propelling trees or the like along a selected path through one or more processing units, such device consisting of three or more driven rollers mounted on the free ends of respective ones of a plurality of pivotally mounted arms having the free ends movable toward and away from said path to respectively bring the rollers into and out of engagement with a tree located in the path. The rollers are disposed in a generally triangular arrangement and each roller has an outer peripheral surface for tractive engagement with the tree, such tractive surface consisting of an undulated surface provided by a series of cleats extending preferably in a direction perpendicular to the feed path. The cleats permit a tree to shift laterally with respect to the feed path. The cleats permit a tree to shift laterally with respect to the feed path while being fed through the processing units thereby facilitating maintaining the tree in alignment with the feed path.

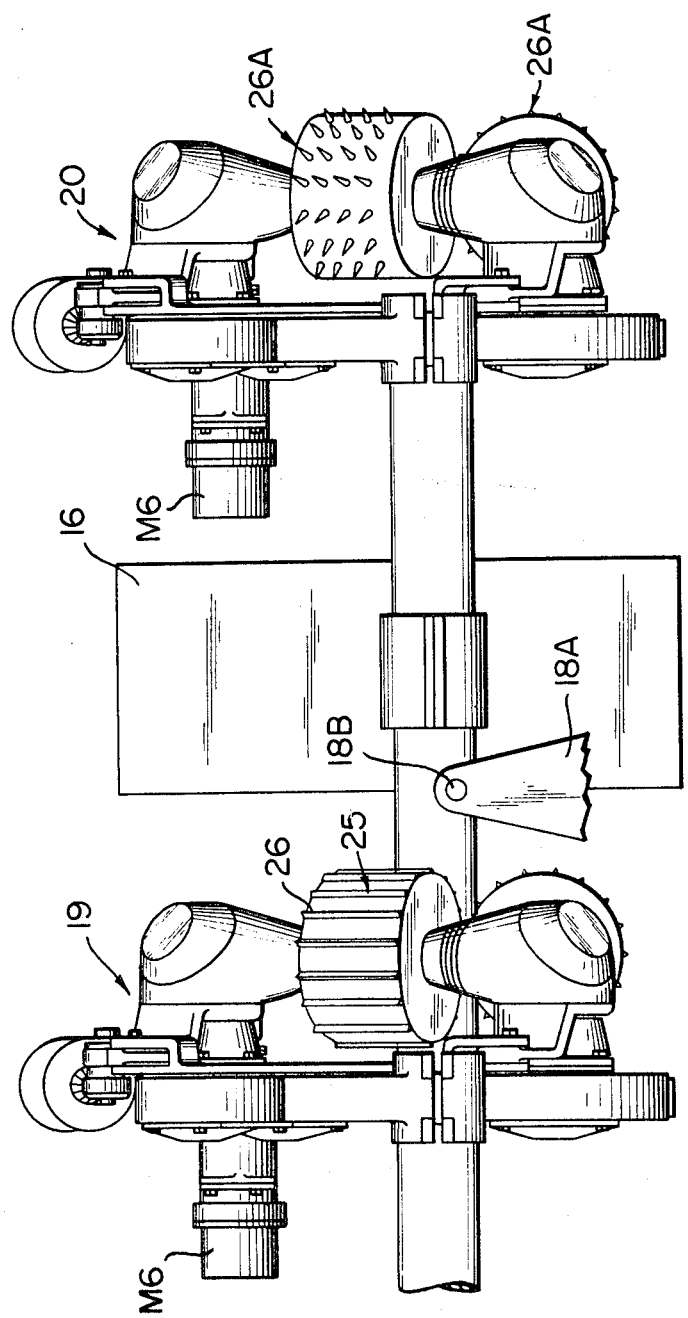

TREE PROCESSING APPARATUS WITH FEED ROLLS

The present invention relates to improvements in feed rolls for use in feeding elongated objects along a path generally parallel to the length of such object.

More specifically, the present invention relates to improvements in feed rolls for use in tree-processing equipment which, for example, may be of the type illustrated in applicant's pending U.S. application No. 485,807 filed Sept. 8th, 1965 and to such improved feed rolls in combination with one or more tree processing units.

Disclosed in the above-mentioned application is a mobile tree-processing unit consisting of a boom and grapple assembly mounted on a vehicle and adapted to pick up and feed felled trees, one after the other, into a series of processing units mounted in tandem alignment on the vehicle. One or more sets of feed rolls is provided for propelling the trees through the processing unit or units, and in general, the trees are propelled along a feed path substantially in alignment with the axis of the processing units. The processing units may consist of a delimber a debarker and a shear or various combinations thereof, and in the preferred form, the delimber and debarker are of the rotary type which include work-engaging tools mounted to rotate about the tree during processing thereof.

In tree-processing equipment of this general type, it is desirable for the tree to follow, as closely as possible, a path coincident with the axis of the processing unit, i.e. the axis of rotation of the delimber and debarker rotors. It is well known, however, that trees are not always straight and this requires a certain amount of lateral shifting of the tree relative to the feed rolls while the trees are being fed through the processed, into the exact path which it should follow while being processed. In view of this, it is desirable to provide a type of feed which will permit a certain amount of lateral movement of the tree. By the term "lateral movement" is meant movement in a direction transverse to the direction of travel the tree normally follows while it is being propelled through the processing units.

The presently known rollers for this purpose have utilized a spiked surface as exemplified by U.S. Pats. Nos. 2,785,715, 2,857,945 and 2,477,922 issued Mar. 19th, 1957, Oct. 28th, 1958 and Aug. 2nd, 1949 respectively. Generally, there are provided in each set of feed rollers, three rollers in a triangular arrangement circumscribing a tree being fed. The rollers are movable in a direction toward and away from the tree and are brought into engagement with the tree clampingly to engage the same. The rollers are driven by virtue of tractive forces, they propel the tree through the processing units. In the known devices, the skipes penetrate the surface of the tree and in so doing prohibit lateral shifting of the tree while being fed.

In accordance with the present invention, a plurality of cleats are substituted for the known spikes on each roll with such cleats being disposed generally in a direction parallel to the axis transverse to the direction of travel of a tree being fed. The cleats or bars, as they may be referred to, provide sufficient gripping force to propel the tree while at the same time permit the tree being fed to slide along the cleats. The trees accordingly may move laterally to a certain extent during processing, thus facilitating maintaining the tree in alignment with the axis of the processing units and allowing trees, which are evoked, to shift such that the portion of the tree engaged by the work tools of the processing unit remains substantially in alignment with the axis thereof while the remaining portion of the tree shifts laterally.

The invention is illustrated, by way of example, in the accompanying drawings wherein:

FIG. 5 is a partial side elevational view illustrating the combination of cleated feed rolls in one assembly and spiked rolls on another assembly located respectively on opposite sides of the processing unit.

Figure 1:
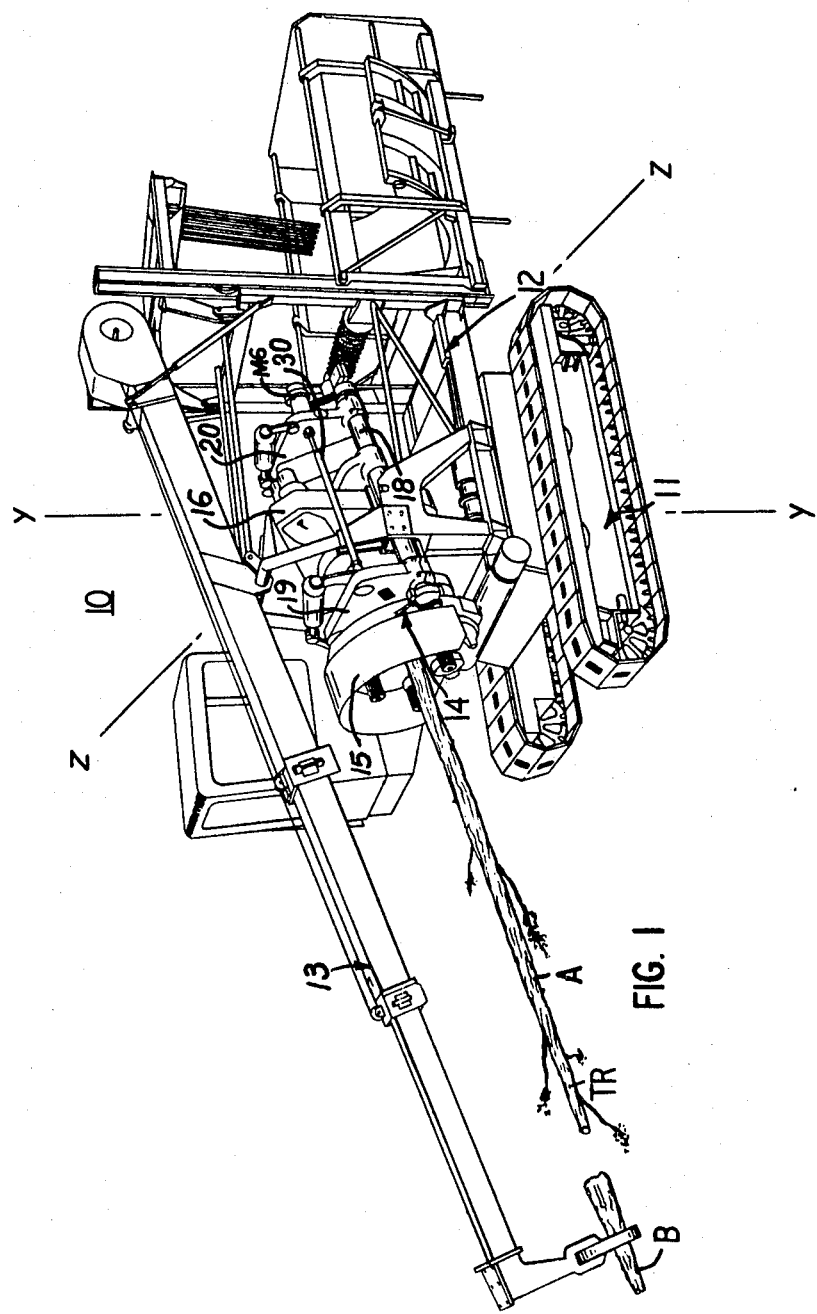
FIG. 1 is an oblique view of a tree processing machine having feed rolls in alignment for feeding trees through axially aligned end-to-end processing units.

Referring now in detail to the drawings, shown in FIG. 1 is a self-propelled mobile-processing unit 10 consisting of a tractor base unit 11 having a frame 12 mounted thereon to pivot about a vertical axis Y-Y. Carried on the frame is a telescopic boom assembly 13 for picking up a felled tree and introducing such tree to the first processing unit of a processing assembly 14. As illustrated, a tree A is being processed by the machine and such tree is followed by a further tree B engaged by the grapple of the boom assembly to introduce the tree B into the processing units immediately upon completion of the processing, by the first processing unit, of the trailing end portion of the tree A. By skill in operation, there will be very little space between the trees A and B, thus permitting a substantially continuous operation.

The processing assembly 14 pivoted about horizontal axis Z-Z, preferably consists of a delimber unit 15, a debarker unit 16 and a shear unit 17 located end-to-end in alignment on a common axis X-X. The delimber is the first unit with reference to direction a tree follows while being processed and this is followed by the debarker which, in turn, if followed by the shear unit. The delimber unit and the debarker unit each preferably consist of a plurality of work-engaging tools mounted on a rotor driven to rotate about the axis X-X. The delimber also preferably includes a plurality of driven cutter heads which, in effect, rotate about an axis parallel to the axis X-X and follow a spiral path relative to a tree moving along such axis. The debarker 16 may be of the type illustrated in U.S. Pat. No. 2,857,945 which removes the bark by cambium fracture. If desired, other types of delimbers and/or debarkers may be used.

Figure 2:
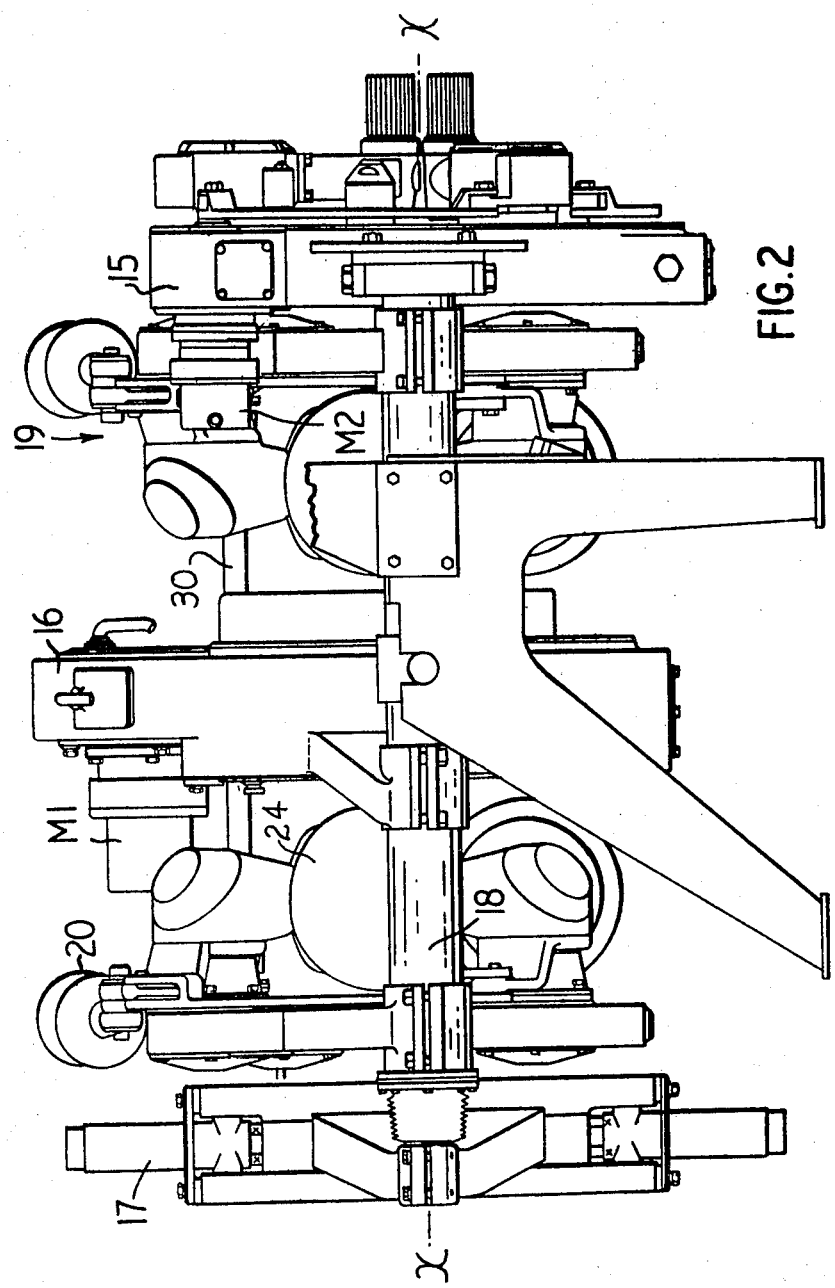
FIG. 2 is a side elevational view of an assembly which includes a series of processing units, in tandem alignment, adapted to be mounted on a machine of the type illustrated in FIG. 1 and a pair of feed rolls for propelling a tree, to be processed, through the processing units.

The combination of a delimer, a debarker, a shear and two sets of feed rolls is illustrated in FIG. 2. It will be observed that this FIG. is a reversed view of that illustrated in FIG. 1 and in actual fact, could be a rear side elevational view of a processing assembly mounted on the vehicle illustrated in FIG. 1. There are, however, some differences between the processing assembly in FIG. 1 and the processing assembly illustrated in FIG. 2. For example, in FIG. 1, the shear has been omitted. It will be realized if one was illustrated, it would be located to the right of the debarker 16.

Each processing unit is detachably secured to a pair of spaced parallel beams or rails 18. Secured to such rails and disposed intermediate the delimber and debarker is a first set of feed rolls 19. A second set of feed rolls 20 is also secured to the beams 18 and such second set is located between the debarker 16 and the shear unit 17. The feed rolls may be independent of the frame of the other processing units as is more fully disclosed in the aforementioned U.S. application No. 485,807 or alternatively secured to the debarker as disclosed in the aforementioned U.S. Pat. 2,857,945.

Figure 3:
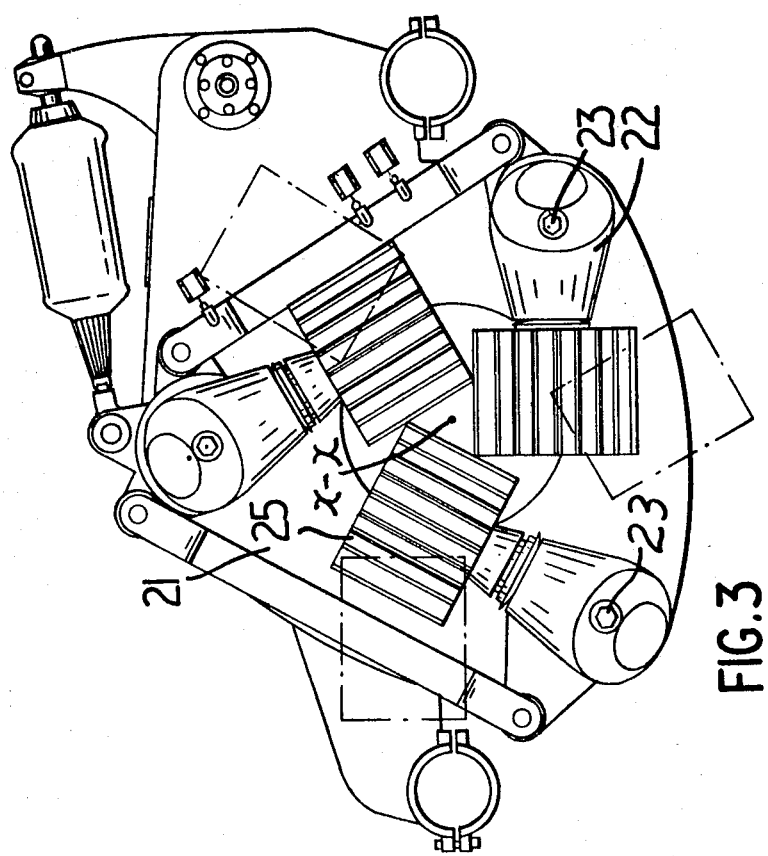
FIG. 3 is a partial front elevational view illustrating a set of feed rolls with the improved rolls thereon constructed in accordance with the present invention.
Figure 4:
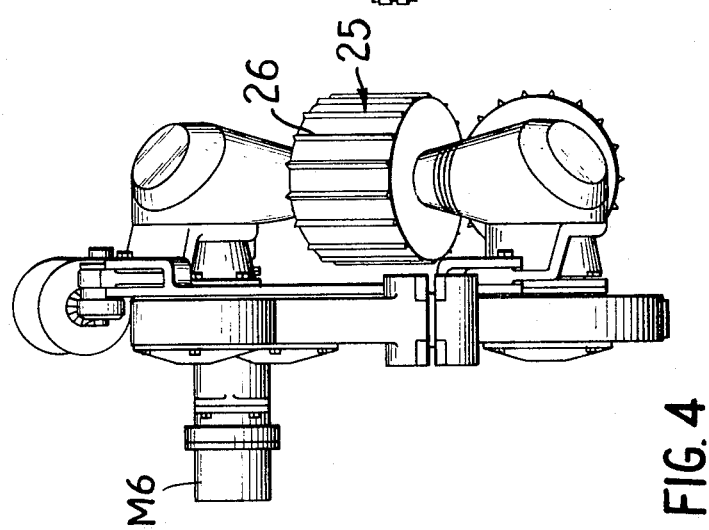
FIG. 4 is a side elevational view of the feed roll assembly illustrated in FIG. 3.

Each set of feed rolls 19 and 20 (see FIGS. 3 and 4) includes a frame 21 having a plurality of arms 22 pivotally mounted thereon to oscillate abut a pin 23. The axis of oscillation is substantially parallel to the axis X-X and the rolls mounted on the ends of the arms are thereby movable in a direction toward and away from the tree. The rollers are disposed so as to overlap one another as illustrated in FIG. 3, and they are so arranged as to provide a space therebetween which is generally in the shape of an equilateral triangle. Such triangle circumscribes the feed path and, as previously mentioned, such feed path is preferably coincident with the axis X-X. A roller 25 is mounted on the free end of each arm 22 and is driven to rotate abut an axis generally transverse to the axis X-X. The rollers may be driven by drive shafts and gear trains (not shown) located in the arms 22 and the frame 21 which, in turn, are driven by a motor M6. The feed roll sets 19 and 20 may each be driven individually by a motor but preferably a single motor is utilized to drive the two assemblies with the motor being mounted on one set and a drive shaft 30 extending from one set to the other to interconnect the two sets. Utilizing one motor and a drive shaft insures that the rolls on the two assemblies are driven at the same speed. The motor M6 may be a hydraulic motor, an electric motor or the like.

The rollers 26 on the first set of feed rolls 19, in accordance with the present invention, are provided with a plurality of cleats 26 on the peripheral tree-engaging surface of such rollers. The cleats 26 illustrated in FIGS. 3 and 4 extend in a direction generally parallel to the axis of rotation of the roller. The cleats, however, need not be parallel to such axis but instead may be at some angle with respect thereto. Furthermore, they need not be exactly parallel to one another but may be at slight angles relative to one another. The important or essential item is that the cleats while engaging a tree to propel the same are disposed at a selected angle with respect to the path followed by the tree being propelled. Preferably, such angle is approximately 90°. The outer tree-engaging edge of each cleat is substantially straight or alternatively such edge may be arcuate. The arcuate shape is in reference to a plane extending radially from the axis of rotation of the roller.

The ribs may be disposed at selected spaced intervals about the periphery of each roller and they may be sufficient depth and sharpness to provide, on pressure engagement with the tree and upon being driven, the necessary propelling force to move the tree through the processing units.

As previously mentioned, the tree engaging edge of each rib may be straight or arcuate and in either event, such edge preferably is relatively smooth so that a tree may be readily slid therealong. In the event the edge is arcuate, it preferably is convex with respect to the roller axis. In FIG. 5 there is illustrated the combination of the two sets of feed rolls and a processing unit located therebetween. Referring to FIG. 5 there is a first set of feed rolls 19 attached as in the previous manner to rails 18 pivotally mounted on a support 18A by a pin 18B. The rollers of the first set of feed rolls 19 are cleated and are located on the infeed side of a processing unit 16 which may be a rotary ring-type debarker or the like. Located on the outfeed side of the same is a second set of feed rolls 20 attached to the beams 18 and which includes three driven rollers arranged in a triangular array as previously described and having a plurality of spikes 26A on the peripheral surface thereof for tractively engaging a tree to be propelled through the processing unit. Obviously, the rib itself may be designed so as to provide the arcuate shape or alternatively the roller surface may be arcuate. The outer edge of the cleats preferably generate the surface of a cylinder in revolution. In this way, there is no variance in the peripheral speed of the cleat edge which engages the tree. Concave or convex edges vary along their length in the distance they extend from the axis of rotation of the roller. This variation in radial distance provides different peripheral speeds of the cleat edge at positions along the cleat and such difference in speed may cause tearing or ripping of the tree surface. The ribs, in effect, provide an undulated or fluted peripheral surface adapted for engagement with the tree. The undulations extend generally in the same direction substantially perpendicular to the feed path.

The rollers 25 of the second set of feed rolls 20 may be either spiked or cleated. In the combination of processing units and two sets of feed rolls, preferably the first set has rollers with a cleated or fluted outer surface and the second set downstream therefrom preferably has rollers which are spiked. It is desirable to use one set of spiked rollers where tree-processing equipment of the rotary type is employed as such spiked rollers resist turning forces applied to the tree by the processing units thus preventing the tree from turning while being processed.

From the foregoing, it is obvious that the cleated rolls permit a tree being propelled to shift laterally relative to the feed path while being fed. In shifting laterally, the tree slides along the cleats and by virtue of being able to slide reduces the stresses and strains which otherwise would be imposed on the feed roll assembly. This is particularly so where a tree is simultaneously contacted at two or more positions spaced longitudinally along the tree for example by one set of feed rolls and the work-engaging tools of a processing unit spaced longitudinally along the the feed path.

I claim:

1. Tree-processing apparatus comprising in combination one or more processing units and means for feeding a tree through said processing unit, said means including a first set of feed rolls comprising three or more rollers spaced about the periphery of the tree and driven to rotate about an axis substantially transverse to the path followed by said tree while being propelled by the rollers through the processing unit, each of said rollers having a plurality of undulations extending in a direction angularly disposed with respect to the path of said tree and outwardly from the peripheral surface of the respective rollers to engage said tree imparting a tractive force onto the latter to assist in propelling the tree through the processing unit and a second set of feed rolls spaced from said first set and located on a side of the processing unit opposite to that of the first set, said second set of feed rolls comprising two or more driven feed rollers disposed in spaced relation around said path and at least one of such rollers being movable toward and away from the feed path respectively to engage and disengage a tree located therein, said feed rollers of the second set each including a spiked peripheral surface for tractive engagement with the tree to be propelled said first set of feed rolls being located on the infeed side and said second set of feed rolls being located on the outfeed side of the processor with reference to the direction of travel of a tree along said feed path during processing of a tree.

2. The combination as defined in claim 1 wherein the outer edge of the undulations which engageable with the tree is substantially straight.

3. The combination as defined in claim 1 wherein the outermost edge of the undulations is substantially straight and parallel to the axis of rotation of the roller associated therewith.

4. The combination as defined in claim 2 therein the outer edge of each undulation is relatively sharp.

5. The combination as defined in claim 1 including a further processing unit located in axial alignment with the first-mentioned processing unit and at a position behind second set of feed rolls.

6. The improvement as defined in claim 1 wherein said second set of feed rolls includes a plurality of rollers disposed in spaced relation circumferentially about the path, and each having a spiked peripheral surface engageable with a tree or like object in said path and movable toward and away from the latter.

7. The combination as defined in claim 1 including a still further processing unit disposed in leading relationship with respect to said first set of feed rolls.

8. The combination as defined in claim 1 wherein said processing unit comprises a delimber, a debarker, a shear or a chipper.

9. The combination as defined in claim 5 wherein said further processing unit comprises a debraker, a shear or a chipper.

10. The combination as defined in claim 7 wherein said processing units consist of a delimber followed by a debarker followed, in turn, by a shear, said first set of feed rolls being located between said delimber and said debarker and said second set of feed rolls being located between said debarker and said shear.

11. The combination as defined in claim 10 further including a common drive for said two sets of feed rolls.

12. The combination as defined in claim 1 wherein the feed rolls and processing units are mounted on a common frame supported by a movable carrier, said combination further including a further log feed means consisting of a boom and grapple assembly mounted on said carrier.

13. The combination as defined in claim 12 wherein said carrier is a self-propelled mobile unit.

14. The combination as defined in claim 10 wherein said processing units are mounted to pivot about a horizontal axis.

15. The combination as defined in claim 14 wherein said processing units are further mounted to pivot about a vertical axis.